Dec. 1, 1931.  E. W. CADNUM  1,833,932
SAFETY DEVICE FOR AUTOMOBILE STEERING GEARS
Filed July 18, 1928

Inventor
E. W. Cadnum
By Chas. J. Williamson
Attorney

Patented Dec. 1, 1931

1,833,932

UNITED STATES PATENT OFFICE

ELZY W. CADNUM, OF BRUNSWICK, OHIO

SAFETY DEVICE FOR AUTOMOBILE STEERING GEARS

Application filed July 18, 1928. Serial No. 293,722.

A source of serious danger in running or driving an automobile is the separation of the ball and socket joint of the steering gear from excessive wear which, of course, results in entire loss of control of the machine. The object of my invention is to overcome this danger, and by means of a device of extreme simplicity and low cost and which can be applied to the standard steering gear without any modification or alteration thereof whatever.

My invention consists in whatever is described by or is included within the terms or scope of the appended claim.

In the standard or conventional automobile steering gear there is a ball and socket joint which comprises a chamber in the end of the drag link into which the ball is inserted through a keyhole slot in the bottom wall of such chamber, and which by friction of the ball shank upon the side edges thereof wears to an extent which will allow the ball to drop through, or sufficient play of the ball may occur as to allow it to drop through the large portion of the keyhole slot. My safety device is simply a sleeve of metal that is applied on the outside of the chambered end of the drag link that completely encircles the same except for a slot or opening that allows the necessary play of the shank of the ball and which is rigid in its cross section so as to make it impossible for the ball member to escape or is capable of effectively resisting any tendency to escape of the ball member from its connection with the drag link.

Figure 1:
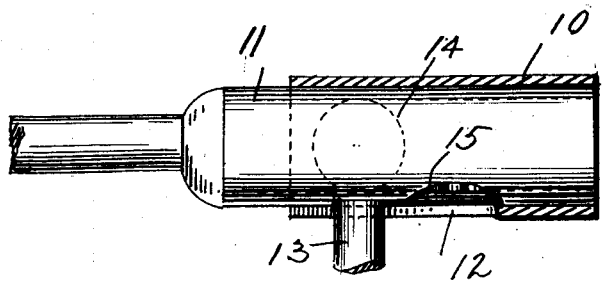
Fig. 1 is a side elevation partly in section of one embodiment of my invention applied to the steering gear.
Figure 2:
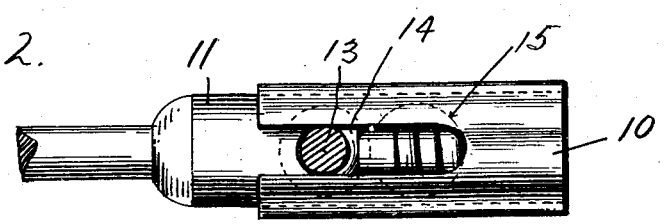
Fig. 2 is a bottom plan view thereof.
Figure 3:
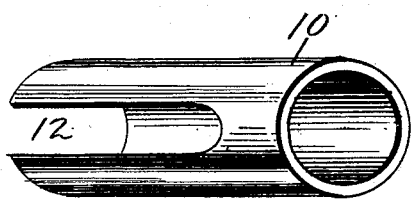
Fig. 3 is a detail view in perspective of the safety device.

In the embodiment of my invention shown in Figs. 1 to 3, my invention is a simple sleeve, 10, in one piece so that it is rigid in cross section and incapable of opening or expanding and whose internal diameter preferably makes a driving fit with the exterior of the end, 11, of the drag link, and which in one side wall has a slot, 12, which opens to one end of the sleeve and which has a width throughout its length barely sufficient to accommodate the shank or stem, 13, of the ball, 14. The open end of the slot is to enable the sleeve to be driven endwise upon the drag-link end, straddling the ball shank or stem, 13, and the closed end of the slot may reach across the enlarged end of the keyhole slot, 15, in the drag link wall. As the side edges or margins of the slot, 12, are spaced apart a distance much less than the diameter of the ball, 14, obviously it is impossible for the ball to pass through such slot.

Figure 4:
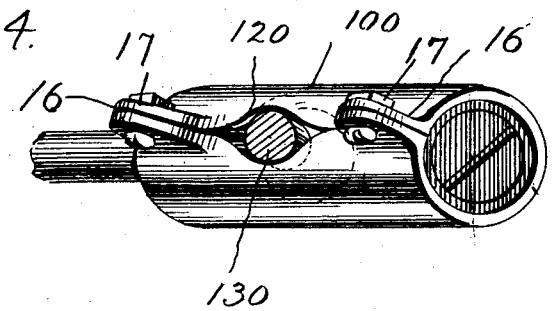
Fig. 4 is a perspective view of another embodiment of my invention.

In the form of my invention shown in Fig. 4 the sleeve, 100, is split longitudinally or lengthwise on one side, and at midlength a hole, 120, is provded for the play of the ball stem, 130, and at each side of such hole on opposite sides of the split are opposing radial lugs, 16, perforated to receive a nut and bolt connector, 17, by which when the sleeve has been applied to the drag link, it may be given that rigidity or immovability in respect of its cross section which is an essential characteristic of my safety device. Of course, to apply the sleeve, 100 of Fig. 4, the bolt securing means must be removed so as to allow sufficient opening of the sleeve to pass the ball stem, 130, in view of the fact that the hole, 120, is not a slot with a permanently open end as in the sleeve shown in Figs. 1 to 3.

A sleeve embodying my invention, especially when in the simple form with the smooth exterior as in Figs. 1 to 3 may be made ornamental or attractive in appearance by nickel plating.

What I claim is:

A safety device for automobile steering gear drag links comprising a ball and socket joint having a socket member, a ball within the socket and a ball shank extending through a side opening in the socket member, a sleeve mounted on the socket member having an opening for the passage and play of the ball stem, said opening being substantially smaller in size than the ball to resist outward movement of the ball, said sleeve being split longitudinally on each side of the opening for the ball stem and having a pair of ears at each side of the ball stem and means to connect the ears of each pair to clamp the sleeve tightly on the socket member.

In testimony whereof I hereunto affix my signature.

ELZY W. CADNUM.